(12) United States Patent
Hartell

(10) Patent No.: US 10,133,146 B2
(45) Date of Patent: Nov. 20, 2018

(54) STRUCTURED ILLUMINATION MICROSCOPY UTILISING ACOUSTO-OPTIC DEFLECTORS

(71) Applicant: University of Leicester, Leicester (GB)

(72) Inventor: Nicholas Anthony Hartell, Letchworth Garden (GB)

(73) Assignee: University of Leicester, Leicester (GB)

( * ) Notice: Subject to any disclaimer, the term of this patent is extended or adjusted under 35 U.S.C. 154(b) by 10 days.

(21) Appl. No.: 15/301,906

(22) PCT Filed: Mar. 19, 2015

(86) PCT No.: PCT/GB2015/050810
§ 371 (c)(1),
(2) Date: Oct. 4, 2016

(87) PCT Pub. No.: WO2015/150730
PCT Pub. Date: Oct. 8, 2015

(65) Prior Publication Data
US 2017/0115547 A1    Apr. 27, 2017

(30) Foreign Application Priority Data

Apr. 4, 2014 (GB) .................................. 1406150.1

(51) Int. Cl.
*G02F 1/11* (2006.01)
*G02F 1/33* (2006.01)
(Continued)

(52) U.S. Cl.
CPC ........... *G02F 1/33* (2013.01); *G02B 21/0032* (2013.01); *G02B 21/0036* (2013.01); *G02B 21/0084* (2013.01); *G02B 27/58* (2013.01)

(58) Field of Classification Search
CPC ........ G02F 1/11; G02F 1/332; G02F 2201/16; G02F 1/33; G06E 3/005; G02B 27/58;
(Continued)

(56) References Cited

FOREIGN PATENT DOCUMENTS

| CN | 100458493 A | 2/2009 |
| CN | 100504514 C | 6/2009 |

OTHER PUBLICATIONS

International Report on Patentablity for PCT/GB2015/050810 (dated Oct. 13, 2015).
(Continued)

*Primary Examiner* — William R Alexander
*Assistant Examiner* — Henry Duong
(74) *Attorney, Agent, or Firm* — Leydig, Voit & Mayer, Ltd.; Gerald T. Gray

(57) ABSTRACT

An apparatus (10) for structured illumination microscopy (SIM) comprises a pulsed femtosecond MiTai laser (11) operable to generate a pulsed beam. The beam pulses are directed on to a specimen (12) via an optical arrangement including a beam steering apparatus comprising a pair of acousto-optic deflectors AODx, AODy, each operable to vary the deflection angle of the beam in response to variation in the frequency of an applied acoustic deflection signal, and an acousto-optic modulator AOM. The frequency of the acoustic deflection signals applied to the AODs and/or the frequency of the acoustic compensation signal applied to the AOM in the present invention is dynamically modulated. This dynamic modulation can increase the effective AODxy scan angle in each direction by about 4 mrads (equivalent to a 15% increase in the area of the field of view). Furthermore, dynamic modulation of the compensation frequency also improves the evenness of the illumination over the field of view.

20 Claims, 3 Drawing Sheets

(51) Int. Cl.
*G02B 21/00* (2006.01)
*G02B 27/58* (2006.01)

(58) Field of Classification Search
CPC ............ G02B 21/0036; G02B 21/0032; G02B 21/0084
USPC ........................................................ 359/310
See application file for complete search history.

(56) References Cited

OTHER PUBLICATIONS

Kremer, Y., et al. "A spatio-temporally compensated acousto-optic scanner for two-photon microscopy providing large field of view." *Optics express* 16.14 (2008): 10066-10076.

Iyer, Vijay, Bradley E. Losavio, and Peter Saggau. "Compensation of spatial and temporal dispersion for acousto-optic multiphoton laser-scanning microscopy." *Journal of biomedical optics* 8.3 (2003): 460-471.

Salome, R., et al. "Ultrafast random-access scanning in two-photon microscopy using acousto-optic deflectors." *Journal of neuroscience methods* 154.1 (2006): 161-174.

International Search Report for PCT/GB2015/050810 (dated Oct. 8, 2015).

Figure 4
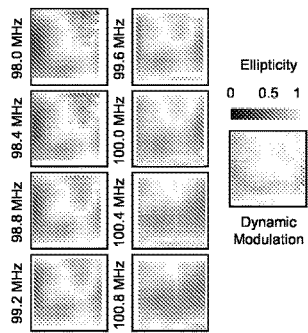
Figure 7
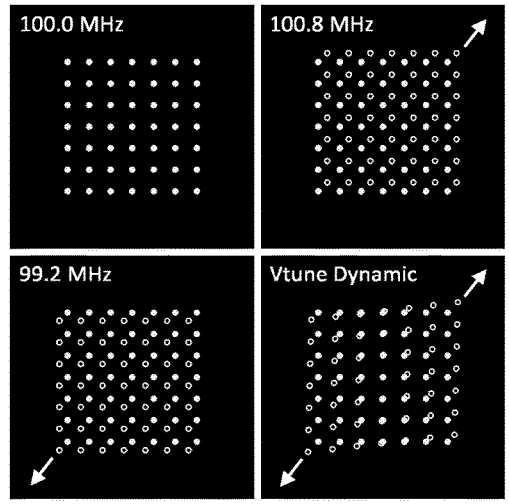
Figure 5
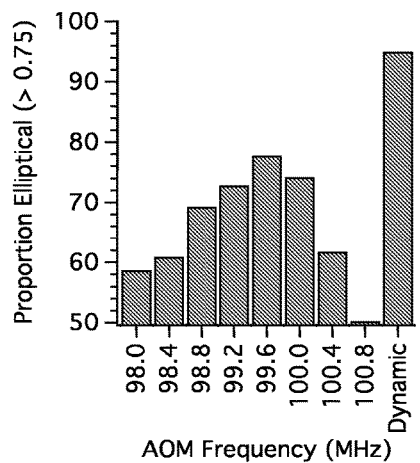
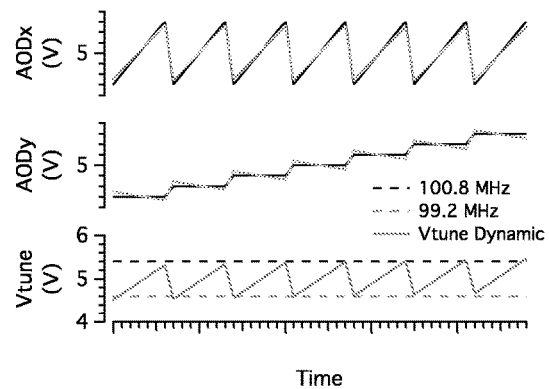
Figure 6

STRUCTURED ILLUMINATION MICROSCOPY UTILISING ACOUSTO-OPTIC DEFLECTORS

TECHNICAL FIELD OF THE INVENTION

The present invention relates to improvements in or relating to super-resolution microscopy, in particular to a form of structured illumination, random access microscopy (Super-RAMP) and most particularly to an improved method and apparatus for structured illumination of specimens utilising acousto-optic deflectors (AODs).

BACKGROUND TO THE INVENTION

Random access microscopy (RAMP) relies upon positioning a point of illumination rapidly over a specimen with a programmable beam steering arrangement. Light emitted by the specimen is then detected with a camera or other detection source. For Super-RAMP microscopy, points of sparse illumination are scanned rapidly over the specimen. Subsequently, a sequence of images from the camera can be used to produce high-resolution, optically sectioned images.

One beam steering arrangement used in such techniques comprises one or more acousto-optic deflectors (AODs) operable to vary the deflection angle of a beam in response to variation in an applied acoustic frequency. In a typical arrangement, a pair of perpendicularly aligned AODs are used to separately control deflection along two perpendicular axes. AODs can be used to address any point in a field of view at random and, by limiting the number of points addressed, very high speeds of acquisition can be achieved. AODs have not been widely adopted for use in multi-photon microscopy because they cause significant temporal and spatial dispersion of the femtosecond pulses required for multi-photon activation. These effects reduce their efficiency and resolution unless they are properly compensated [12-18].

One compensation solution is to use an acousto-optic modulator (AOM) as a source of both spatial and temporal compensation [19]. If the AOM is positioned at 45 degrees and opposite to the direction of the perpendicularly aligned AODs, and the acoustic frequency applied to the AOM is carefully selected to match that applied to the AOD pair, this provides good compensation over a range of wavelengths [20]. The AOM also introduces negative group velocity displacement (GVD) and the distance between the AOM and AODs can be adjusted to provide optimal temporal compensation at different wavelengths [20].

Nevertheless, even using these techniques, there is still a limit to the displacement achievable using AODs and in particular to the displacement achievable without adversely impacting on the spatial profile of the beam. Typically, as the displacement increases, the beam profile becomes more elliptical. One way to combat the beam profile problem is to use large aperture AOMs and AODs but relatively small increases in the aperture size of such devices correlate to relatively large increases in their expense. Additionally, the illumination intensity also varies across the available scan area. The variation in illumination intensity is at least partially attributable to the substantially Gaussian profile of the beam upon entry to the AOM/AOD arrangement. These effects can reduce the efficiency and resolution achievable.

It is therefore an object of the present invention to provide an improved beam steering arrangement that at least partially overcomes or alleviates the above problems.

SUMMARY OF THE INVENTION

According to a first aspect of the present invention there is provided a beam steering apparatus comprising: one or more acousto-optic deflectors (AODs) operable to deflect the beam in response to applied acoustic deflection signals; and an acousto-optic modulator (AOM) operable in response to an applied acoustic compensation signal to compensate for spatial and temporal disruption to the beam caused by the one or more AODs, wherein the frequency of the acoustic compensation signal or the frequencies of the acoustic deflection signals are dynamically varied.

Use of a dynamically varied frequency for the acoustic compensation signal or the acoustic deflection signals increases the range of displacement that can be achieved using a particular beam steering arrangement whilst minimising distortion of the spatial profile of the beam or spatial displacement of the beam. Furthermore, dynamic modulation of the acoustic compensation signal can also provide control over the spatial intensity of illumination of the beam so as to reduce the variation across the illumination area as a whole. In a particular example, this can result in an increase in the effective scan angle of up to 4 mrads compared to constant acoustic compensation frequency devices, thus increasing the illuminable area by around 15%.

The dynamic frequency variation may occur according to any suitable criteria. Preferably the dynamic frequency variation comprises modulation of the acoustic compensation signal frequency about a centre frequency or modulation of the acoustic deflection signals about a centre frequency or a centre frequency pattern. For a regular grid scanning pattern, the modulation of the acoustic deflection signals may be substantially sinusoidal or triangular. For a pattern with a static optimum modulation frequency of 100 MHz, variations of the order of, say, ±2 MHz (and in one preferred embodiment±0.8 MHz) improve the overall compensation over a larger scan area. For a regular grid scanning pattern, the modulation of the acoustic compensation signal may be defined by an inverted and scaled intensity profile for a single grid line. The intensity profile may be an expected intensity profile. Alternatively, the intensity profile may be a measured intensity profile. In such cases, the measurements may be based on the preceding line or the present line in a preceding scan. The modulation may be adjusted during operation.

The centre frequency can be preset. Alternatively, the centre frequency may be determined according to a particular function. Preferably, the centre frequency is dependent upon the frequency of the centre of the field of view for the or each AOD. In particular, the centre frequency for the acoustic compensation signal $F_{AOM}$ is determined from the frequency $F_0$ of the centre of the field of view for the or each AOD by:

$$F_{AOM} = \sqrt{2} \times_0$$

The AOM is preferably provided in the beam path ahead of the or each AOD. The separation distance along the beam path between the AOM and the or each AOD may be selected to provide optimal temporal compensation for the action of the or each AOD. In some embodiments, the separation distance along the beam path between the AOM and the or each AOD may be adjustable. The separation distance may be adjusted in response to variations in the beam wavelength.

In one embodiment, there are two AODs. In such cases the AODs are preferably arranged in a mutually perpendicular orientation. Preferably, the AOM is aligned at substantially 45° and opposite to the direction of the perpendicularly aligned AODs.

According to a second aspect of the present invention, there is provided an apparatus for imaging, the apparatus comprising: a beam generating device; a beam steering arrangement operable to selectively illuminate a series of sparsely separated points of a specimen; and a detection arrangement operable to capture images resulting from said illumination wherein the beam steering apparatus comprises: one or more AODs operable to deflect the beam in response to applied acoustic deflection signals; and an AOM operable in response to an applied acoustic compensation signal to compensate for spatial and temporal disruption to the beam caused by the one or more AODs, wherein the frequency of the acoustic compensation signal or the frequencies of the acoustic deflection signals are dynamically varied The apparatus of the second aspect of the present invention may include any or all features of the first aspect of the present invention as desired or as appropriate.

The apparatus may be adapted for any suitable form of imaging, including but not limited to: structured illumination techniques such as structured super-resolution multi photon imaging; random access microscopy (RAMP); or other applicable techniques.

The beam generating device may take any suitable form. In a preferred embodiment, the beam generating device is a laser. The laser may be an optical laser. The laser may be a continuous wave laser or a pulsed laser. The laser may be a tunable laser.

The apparatus may be provided with additional optical elements such as mirrors, lenses and the like to condition and direct it from a beam generation device to the beam steering apparatus and from the beam steering apparatus to the specimen.

The detection arrangement may comprise and suitable device including but not limited to photomultipliers, photodiodes cameras or detector arrays. In a preferred embodiment, the detection arrangement comprises a CCD, EMCCD, CMOS or sCMOS camera.

The apparatus may further include an image processing unit. The image processing unit may be operable to process individual images or sequences of images captured by the detection arrangement.

According to a third aspect of the present invention, there is provided a method of compensating for spatial and temporal disruption to a beam steered by one or more AODs in response to applied acoustic deflection signals, the method comprising the steps of: providing an AOM in the beam path; applying an acoustic compensation signal to the AOM, wherein the frequency of the acoustic compensation signal or the frequencies of the acoustic deflection signals are dynamically varied.

The method of the third aspect of the present invention may incorporate any or all features of the first and second aspects of the present invention as desired or as appropriate.

DETAILED DESCRIPTION OF THE INVENTION

In order that the invention may be more clearly understood an embodiment/embodiments thereof will now be described, by way of example only, with reference to the accompanying drawings, of which:

FIG. 4 illustrates the ellipticity of the beam at each illumination point over the full field of view resulting from applying an acoustic compensation signal at various constant frequencies over a grid of illumination points compared with using dynamic modulation of the an acoustic compensation signal frequency;

FIG. 5 illustrates the proportion of illumination points where the beam ellipticity is greater than 0.75 at various constant frequencies over a grid of illumination points resulting from applying an acoustic compensation signal compared with using dynamic modulation of the acoustic compensation signal frequency;

Figure 8:
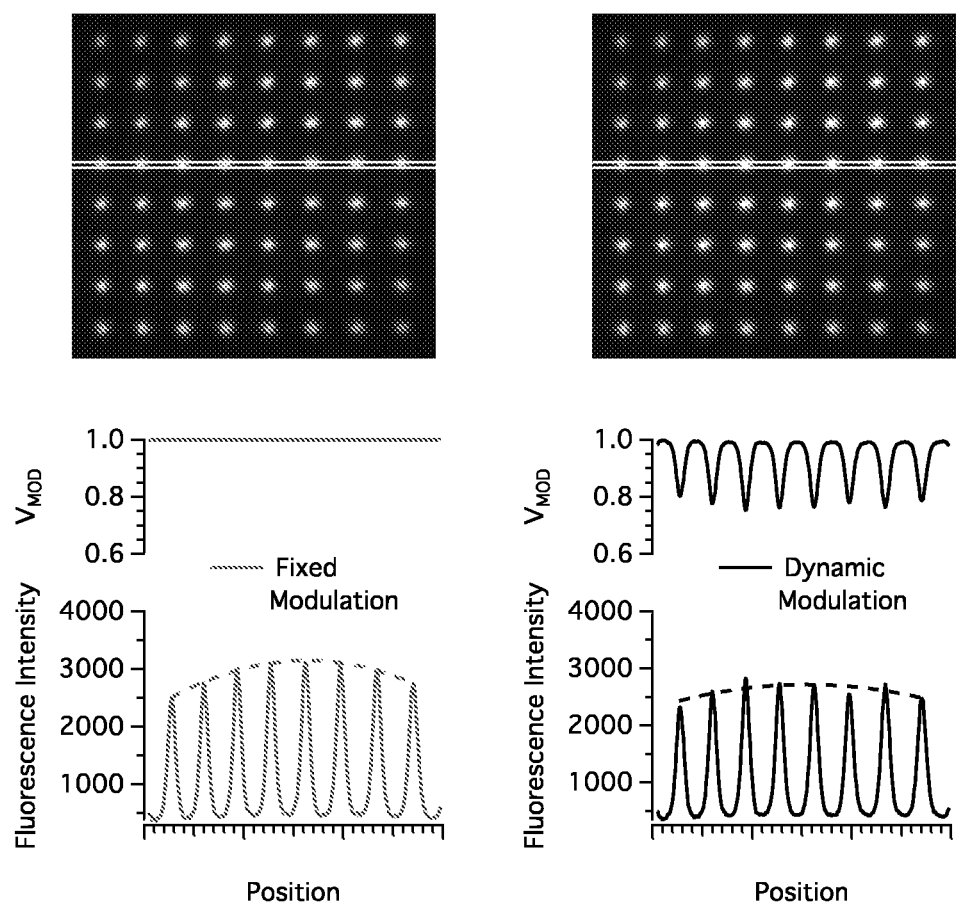

FIG. 6 provides an example of the control voltages required for scanning a grid of 7×7 spots;

FIG. 7 provides a comparative illustration of the results achieved with dynamic modulation of the acoustic deflection signal frequencies of the acousto-optic deflectors; and FIG. 8 provides a comparative illustration of the results achieved with dynamic modulation of the acoustic compensation signal frequency of the acousto-optic modulator.

Figure 1:
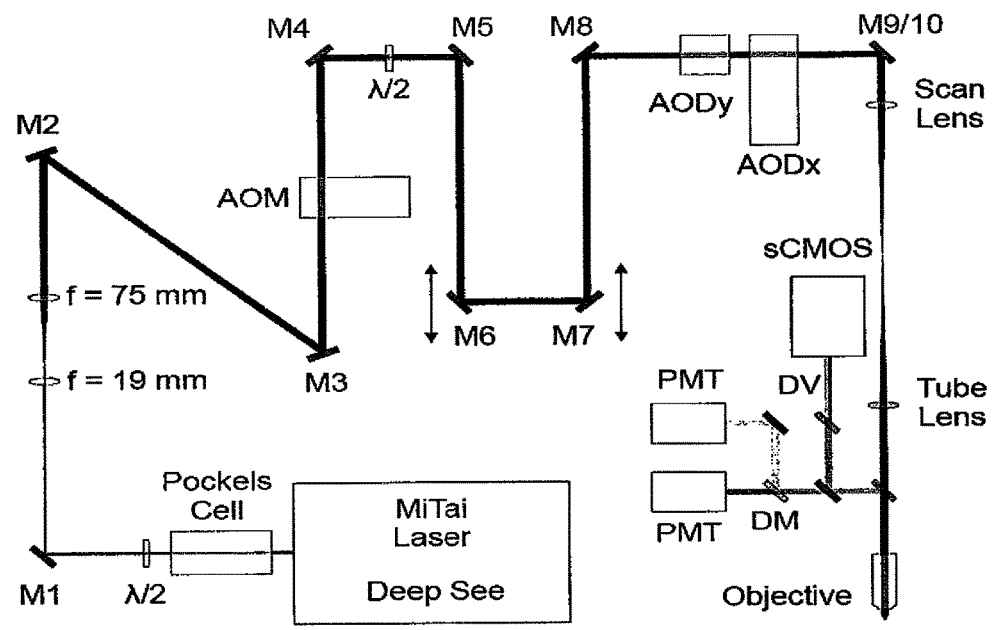
FIG. 1 shows a schematic illustration of an apparatus for structured illumination microscopy (SIM) according to the present invention.
Figure 2:
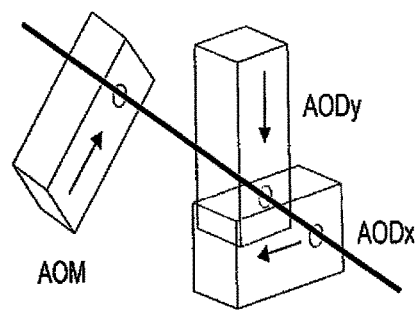
FIG. 2 is an expanded schematic illustration of the relative orientation of the AOM and the AODs in FIG. 1.

Turning to FIG. 1, an apparatus 10 for imaging is shown. In the particular example of FIG. 1, the apparatus 10 adapted for performing structured illumination microscopy (SIM) but the skilled man will appreciate that the apparatus 10 may be adapted for other multi-photon or single photon imaging techniques. The apparatus comprises a pulsed femtosecond MiTai laser 11 operable to generate a pulsed beam. The beam pulses are directed by on to a specimen 12 via an optical arrangement comprising achromatic half-wave plate λ/2; plain mirrors M1-M10; tube lens TL and objective microscope 13. The beam pulses are steered by a beam steering apparatus comprising a pair of acousto-optic deflectors AODx, AODy each operable to vary the deflection angle of the beam in response to variation in an applied acoustic frequency and an acousto-optic modulator AOM.

In operation, the beam steering apparatus will be operable so as to sequentially illuminate a series of sparsely separated points of specimen 12, the illumination points typically being arranged in an n×n grid pattern. As a result of the illumination, the specimen will emit light which is collected by an objective 13 and directed to image sensors including photomultiplier tubes PMT and a camera 14. In the present example, the camera is an sCMOS camera, but the skilled man will appreciate that alternative cameras or detectors may be used if appropriate. The Photomultiplier tubes PMT allow the apparatus to be utilised for various imaging modes, as required or desired.

The camera 14 is operable to capture a series of images, each image of the emission resulting from one illumination of the illumination pattern. In use, the AODs are used in combination with the laser to scan sequences of sparsely separated points in a grid pattern. The camera 14 is operable to capture an image of the emission resulting from one illumination of the grid pattern. The grid is then shifted sequentially and a further image captured, so that the entire field of view was eventually covered. Subsequently, each image in the sequence is processed to generate an enhanced image and a sequence of enhanced images are then combined to generate a composite image.

Turning now to the beam steering apparatus in more detail, a pair of perpendicularly aligned AODs (AODx, AODy) are used to separately control deflection along two perpendicular axes (x, y). The AOM is adapted to provide spatial and temporal compensation to the beam in respect of the significant temporal and spatial dispersion caused by AODx, AODy. To optimise this compensation, the AOM is positioned at 45 degrees to and opposite to the direction of perpendicularly aligned AODx and AODy.

With regard to temporal dispersion, the AOM provides a negative group velocity displacement (GVD). For a pair of AODs separated by distance D, and characterised by their frequencies F, the negative GVD can be described by the equation:

$$GVD_{AOD/AOD} = -D \frac{\lambda^3}{2\pi c^2} \frac{F^2}{v^2}$$

where $\lambda$ is the wavelength of light, c is the speed of light and v is the sound velocity. Therefore, the placement of an AOM at a suitable distance D in front of AODx and AODy enables temporal dispersion compensation. Since the distance D is partly determined by the wavelength of the beam $\lambda$, in some embodiments, the separation of the AOM and AODx, AODy may be adjustable.

In known systems, a fixed frequency acoustic compensation signal is applied to the AOM to optimise the spatial compensation. The fixed frequency $F_{AOM}$ is determined from the frequency $F_0$ of the centre of the field of view for AODx and AODy by:

$$F_{AOM} = \sqrt{2} \times F_0$$

The compensation provided by this technique is optimal in the centre of the AOD field of view but reduced at the edges of the field of view leading to increased ellipticity of points, reduced resolution and uneven illumination. Good compensation over a reasonably sized field of view therefore requires large aperture AOMs and AODs which are expensive to manufacture.

Figure 3:
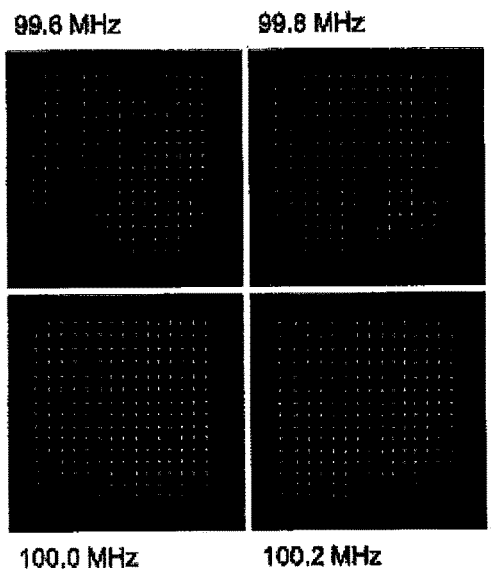
FIG. 3 illustrates the compensation of spatial dispersion of the beam resulting from applying an acoustic compensation signal at various constant frequencies over a grid of illumination points.

The amount and quality of the spatial compensation achievable in this manner is shown in FIG. 3. The images in FIG. 3 each result from the structured illumination of a grid pattern of spots onto a slide coated with an even layer of fluoroscein, using AODx and AODy with centre frequencies $F_0$ of 75 MHz and a fixed frequency acoustic compensation signal $F_{AOM}$ of 99.6 MHz, 99.8 MHz, 100.0 MHz and 100.2 MHz respectively. As can be appreciated visually, the compensation was maximal at ~99.6-99.8 MHz, just below the theoretical optimum of 100 MHz for an AOD pair with a centre frequency of 75 MHz.

It is possible to quantify the amount and quality of the spatial compensation by measuring the spot ellipticity as a ratio of the long and short axes of two-dimensional Gaussian fits the spots in the images of FIG. 3. In such a scheme, a perfectly round spot has a value of 1.0. The heat plots in FIG. 4 illustrate how the spot ellipticity varies over the field of view for various compensation frequencies $F_{AOM}$. It is therefore clear that the spatial compensation is not very uniform at any of the frequencies tested and the pattern of non-uniformity varies dependent on the compensation frequency $F_{AOM}$. Similarly, the chart of FIG. 5, illustrates the relatively low proportion of spots having ellipticity greater than 0.75 at these various fixed values of the compensation frequency $F_{AOM}$.

In order to address this issue, the frequency of the acoustic deflection signal applied to the AODs in the present invention is dynamically modulated. An example of the form of modulation for the acoustic deflection signals for a pair of x and y AODs is illustrated in FIG. 6. A grid scan pattern is produced by applying a saw tooth (triangular) control voltage V (xAOD) to the xAOD and a stepped, increasing voltage V (yAOD) to the yAOD. These voltages are converted into a frequency and applied to the x and y AODs. Changing the frequency by a small amount either side of the centre frequency (say to 99.2 MHz from 100 MHz or to 100.8 MHz from 100 MHz as shown in FIG. 6) is achieved by varying the offset voltage applied in each pattern. This alters the position of best ellipticity of the resulting spots and produces a small, linear shift in the position of the grid.

The dynamic modulation is achieved by varying the offset voltage in a saw tooth pattern synchronised with the overall grid scan pattern, as illustrated by Vtune Dynamic in FIG. 6. This produces a slight skew on the pattern of the control voltages V (xAOD), V (yAOD) as is illustrated by the lighter lines in the respective plots of FIG. 6. FIG. 7 illustrates that a constant offset voltage (for example 99.2 MHz or 100.8 MHz) produces a skewed spot pattern (albeit one where the overall ellipticity may be improved as illustrated in FIGS. 3 and 4). However, FIG. 7 further illustrates that the skewed pattern can be returned to a substantially square grid by use of dynamic offset voltages (Vtune Dynamic) shown in FIG. 6.

Turning to FIG. 4, an equivalent intensity map for the dynamically modulated compensation frequency is shown. As can be readily seen from inspection, the intensity plot for the dynamically modulated compensation frequency is considerably more even than any of the intensity plots for fixed compensation frequencies. Similarly, FIG. 5 clearly illustrates that the proportion of spots having ellipticity greater than 0.75 is considerably greater for the dynamically modulated compensation frequency than for fixed compensation frequencies.

From the above, it can be determined that dynamic modulation of the frequency of the acoustic deflection signal can increase the effective AODxy scan angle in each direction. In particular, implementation, increases in the effective scan angle of about 4 mrads have been achieved. This equates to a 15% increase in the area of the field of view.

In addition to the above, dynamic modulation of the frequency of the acoustic compensation signal of the AOM also improves the evenness of the illumination over the field of view. As with the acoustic deflection signal, this can be achieved by supplying dynamic adjustments to the voltage ($V_{MOD}$) applied to the modulation input of the AOM during scanning. FIG. 8 provides a comparison between a steady $V_{MOD}$ and a dynamically modulated $V_{MOD}$ and the respective outcomes in terms of the intensity of light passing through the AOM. Using a steady $V_{MOD}$ as shown on the left, the intensity profile of the marked line of spots of excitation light within a grid is Gaussian with the peak intensity close to the centre of the field of view. On the right side of FIG. 8, a dynamically modulated $V_{MOD}$ is applied. In this instance, the dynamic modulation comprises an inverted and scaled version of the expected/measured intensity profile. In response to such modulation, the intensity profile of the line of spots of excitation light is significantly more even over the field of view.

The above embodiment is described by way of example only. Many variations are possible without departing from the scope of the invention as defined in the appended claims.

The invention claimed is:

1. A beam steering apparatus comprising:
   one or more acousto-optic deflectors (AODs) operable to deflect the beam in response to applied acoustic deflection signals; and
   an acousto-optic modulator (AOM) operable in response to an applied acoustic compensation signal to compensate for spatial and temporal disruption to the beam caused by the one or more AODs,
   wherein the frequency of the acoustic compensation signal or the frequencies of the acoustic deflection signals are dynamically varied.

2. A beam steering apparatus as claimed in claim 1 wherein the dynamic frequency variation comprises modulation of the acoustic compensation signal frequency about a centre frequency, or wherein the dynamic frequency variation comprises modulation of the acoustic deflection signals about a centre frequency or a centre frequency pattern.

3. A beam steering apparatus as claimed in claim 2 wherein the modulation of the acoustic deflection signals is substantially triangular.

4. A beam steering apparatus as claimed in claim 1, wherein the modulation of the acoustic compensation signals is defined by an inverted and scaled intensity profile for a single grid line.

5. A beam steering apparatus as claimed in claim 1, wherein the modulation is adjusted during operation.

6. A beam steering apparatus as claimed in claim 1, wherein the AOM is provided in the beam path ahead of the or each AOD.

7. A beam steering apparatus as claimed in claim 1, wherein there are two AODs arranged in a mutually perpendicular orientation, and wherein the AOM is aligned at substantially 45° and opposite to the direction of the perpendicularly aligned AODs.

8. An apparatus for imaging, the apparatus comprising:
   a beam generating device;
   a beam steering arrangement operable to selectively illuminate a series of sparsely separated points of a specimen; and
   a detection arrangement operable to capture images resulting from said illumination, wherein the beam steering arrangement comprises:
   one or more AODs operable to deflect the beam in response to applied acoustic deflection signals; and
   an AOM operable in response to an applied acoustic compensation signal to compensate for spatial and temporal disruption to the beam caused by the one or more AODs,
   wherein the frequency of the acoustic compensation signal or the frequencies of the acoustic deflection signals are dynamically varied.

9. An apparatus as claimed in claim 8 wherein the dynamic frequency variation comprises modulation of the acoustic compensation signal frequency about a centre frequency, or wherein the dynamic frequency variation comprises modulation of the acoustic deflection signals about a centre frequency or a centre frequency pattern.

10. An apparatus as claimed in claim 9 wherein the modulation of the acoustic deflection signals is substantially triangular.

11. A beam steering apparatus as claimed in claim 8 wherein the modulation of the acoustic compensation signals is defined by an inverted and scaled intensity profile for a single grid line.

12. An apparatus as claimed in claim 8 wherein the modulation is adjusted during operation.

13. An apparatus as claimed in claim 8 wherein the AOM is provided in the beam path ahead of the or each AOD.

14. An apparatus as claimed in claim 8 wherein there are two AODs arranged in a mutually perpendicular orientation, and wherein the AOM is aligned at substantially 45° and opposite to the direction of the perpendicularly aligned AODs.

15. A method of compensating for spatial and temporal disruption to a beam steered by one or more AODs in response to applied acoustic deflection signals, the method comprising the steps of:
   providing an AOM in the beam path; and
   applying an acoustic compensation signal to the AOM, wherein the frequency of the acoustic compensation signal or the frequencies of the acoustic deflection signals are dynamically varied.

16. A method as claimed in claim 15 wherein the dynamic frequency variation comprises modulation of the acoustic compensation signal frequency about a centre frequency, or wherein the dynamic frequency variation comprises modulation of the acoustic deflection signals about a centre frequency or a centre frequency pattern.

17. A method as claimed in claim 16 wherein the modulation of the acoustic deflection signals is substantially triangular.

18. A method as claimed in claim 16, wherein the centre frequency is preset, or wherein the centre frequency is determined dependent upon the frequency of the centre of the field of view for the or each AOD.

19. A beam steering apparatus as claimed in claim 15, wherein the modulation of the acoustic compensation signals is defined by an inverted and scaled intensity profile for a single grid line.

20. A beam steering apparatus as claimed in claim 15, wherein the modulation is adjusted during operation.

* * * * *